May 31, 1949.　　　　　J. BUDIG　　　　　2,471,407
CHUCK
Filed April 17, 1945　　　　　　　　　　　2 Sheets-Sheet 1
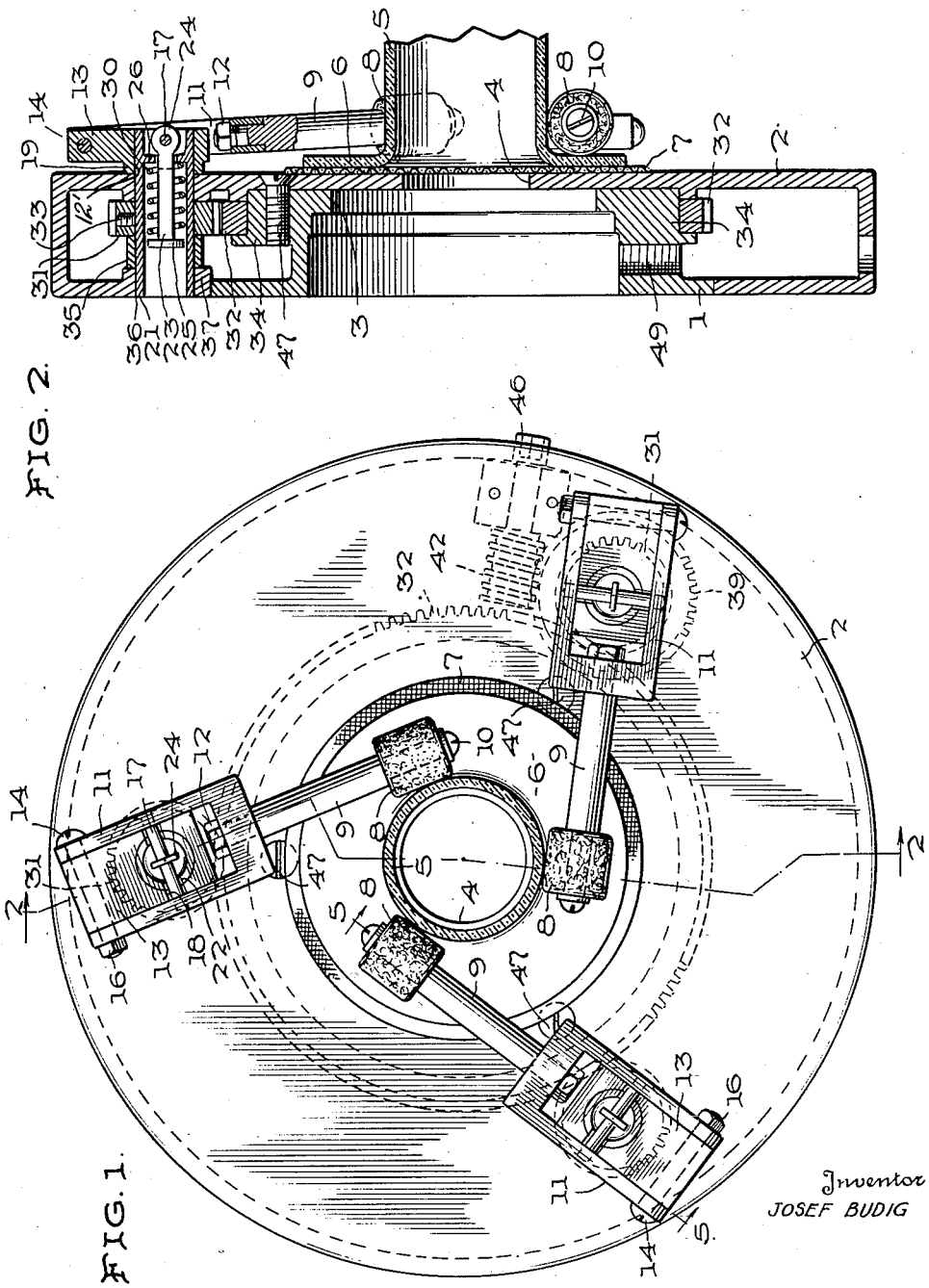
Inventor
JOSEF BUDIG May 31, 1949.                    J. BUDIG                    2,471,407
                                  CHUCK
Filed April 17, 1945                                  2 Sheets-Sheet 2

Inventor
JOSEF BUDIG

Patented May 31, 1949

2,471,407

UNITED STATES PATENT OFFICE 2,471,407

CHUCK

Josef Budig, Elmont, N. Y., assignor to Federal Telephone and Radio Corporation, New York, N. Y., a corporation of Delaware Application April 17, 1945, Serial No. 588,758

4 Claims. (Cl. 279—33)

This invention relates to a chuck assembly for holding flared articles. It is especially designed for holding flared glass articles while performing certain operations on them, more particularly in the manufacture of vacuum tubes.

One object of my invention is to provide a chuck assembly which will support a flared glass article in such a manner that operations requiring great accuracy may be easily performed thereon.

Another object of my invention is to provide a chuck assembly which is capable of accurately positioning and supporting glass tubes of different diameters having flares or flanges which may be of different diameters and thicknesses without removing any parts and by simple manipulation by means such as a key. The provision for adjusting to accommodate different diameter tubes is further and desirably of a self-locking or irreversible type.

Another object of my invention is to not only support a flared glass article firmly and accurately but also without danger of injury to the article.

To achieve the objects as referred to, the invention in its preferred embodiment as illustrated employs an arrangement of multiple work engaging members or rollers supported for non-yielding radially adjustable movement for simultaneous adjustment for centering the article by engaging the outer surface of the tubular portion thereof while permitting yielding of the rollers in an axial direction to accommodate varied forms and sizes of flanges. The yielding supporting arrangement is preferably resilient and effective to clamp the article against a supporting surface under axially directed pressure application.

Other objects and advantages of the invention will be apparent to those skilled in the art from a consideration of the following description and accompanying drawing forming a part of this specification in which one embodiment of the invention has been described and illustrated and in which similar reference characters indicate the same parts and wherein:

Figure 1 is an end view partially broken away of a chuck assembly embodying my invention;

Figure 2 is a cross sectional view on the line 2—2 of Fig. 1;

Figure 5:
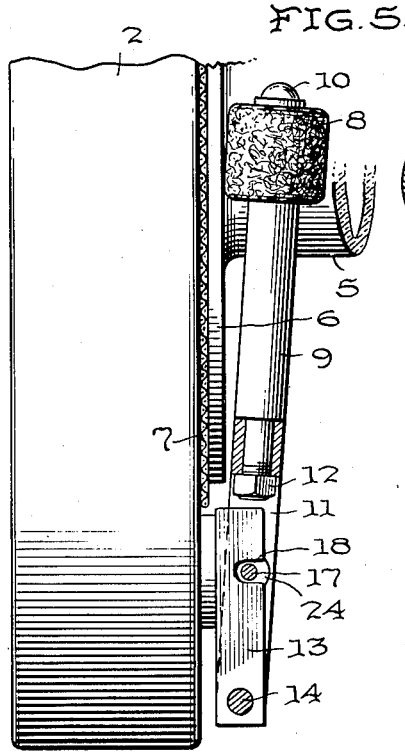
Figure 5 is a view taken on the line 5—5 of Fig. 1.
Figure 6:
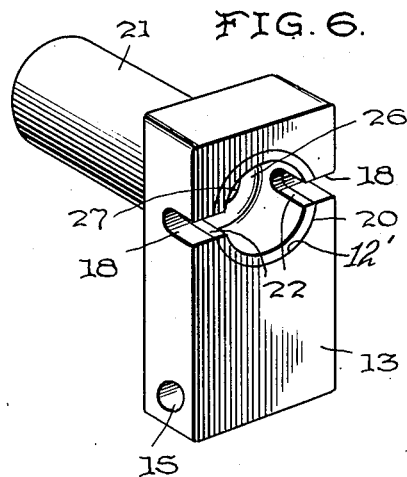
Figure 6 is a perspective view of one of the supporting blocks and its cooperating sleeve or pinion shaft for one of the roller arms.

My improved chuck comprises briefly means in the form of three rollers for holding the flared ends of glass tubes. The housing for the chuck consists of two castings, an inner casting 1 and an outer casting 2. There is a central passageway or a hole 3 in casting 1 and a central passageway or a hole 4 in casting 2 which are as shown in Figure 2 of different diameters although this is not important. Numeral 5 represents a glass tube to be acted upon having a flared end 6. Between the flared end 6 and the casting 2 is placed a gasket 7 which may be made of some suitable material, as for instance, asbestos. As shown clearly in Figure 2 the asbestos gasket lies over the holes 3 and 4 and serves as a pad or a cushion for the flared end of the glass tube. Three rollers 8 which are made of suitable material as asbestos composition or Bakelite serve to center and hold down the glass tube. These rollers are restrained from sliding off sleeves 9 by means of screw studs 10, the sleeves in turn being attached to U-shaped members or yokes 11 by means of the studs extending therethrough to receive threaded securing nuts 12. The yokes 11 are pivotally mounted on supporting blocks 13 by means of bolts 14 serving as fulcrums. The bolts pass through holes 15 bored in the supporting blocks and are held thereon by means of nuts 16. Near the central part of the U-shaped members dowel pins 17 are fastened and these are guided in the slots 18 in the supporting blocks 13. The supporting blocks 13 have flanges 19 on the sides thereof nearest the casting 2 and these flanges are in contact with the casting 2 as shown in Figures 2 and 5. These flanges are integral with the supporting blocks. In each supporting block there is a circular hole 12' and press fitting within these holes are hollow pinion shafts 21 having slots 22 in them which cooperate with slots 18 to form bearings for the pins 17.

Figure 3:
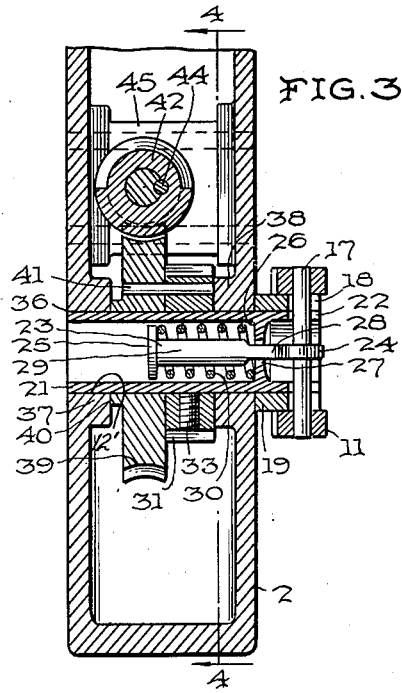
Figure 3 is a cross sectional view showing the means for moving the hold-down arms into and out of engagement with a glass tube.

The means for holding the rollers in pressing contact with the flared ends of the glass tube will now be described; spring bearing rods or pins 23 (see Figure 2) are pivotally suspended from the dowel pins 17 and extend into the hollow shafts 21. These pins 23 have enlarged heads 24 with holes in the center of the heads, the dowel pins passing through the holes and serving as pivotal bearings for the pins. At their other extremities the pins 23 have heads 25. A short distance from the inside of one of their ends, the shafts 21 have integral inwardly extended flanges or shoulders 26 with center holes 27 through which the pins 23 extend. The pins are shaped in cross section as shown in Figure 3, narrow at one end as shown at 28 and wider at the other end as shown at 29. Surrounding the pins 23 and extending from the shoulders 26 to the heads 25 are compression springs 30 which keep the rollers 8 pressed against the flange 6 of the glass tube but allow the sleeves and rollers to ride up on the flange 6.

Figure 4:
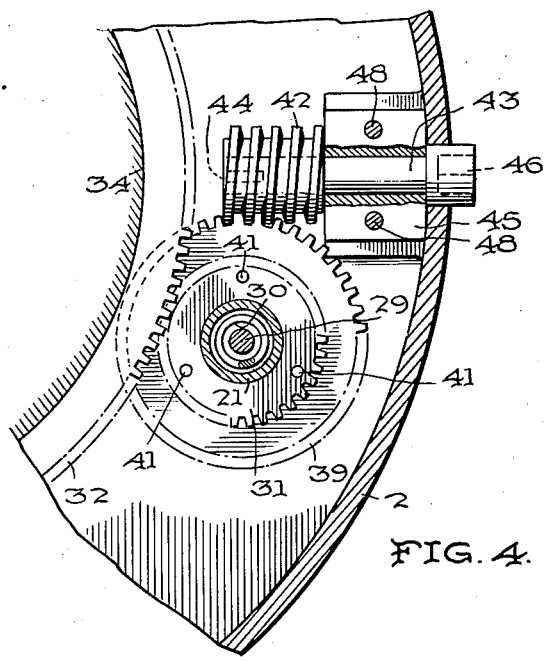
Figure 4 is a cross sectional view on the line 4—4 of Fig. 3.

The means for simultaneously swinging all of the rollers into and out of position with regard to the flanged glass tube will now be described: By my invention I am able to move all three rollers at the same time and to the same degree thereby obtaining accurate control and adjustment. Surrounding a part of each of the three pinion shafts 21 and fixed thereon are pinions 31 whose teeth engage teeth on a ring gear 32 which is common to all three of the pinions or small gears 31. The pinions are keyed to the pinion shafts by suitable means which may be screws 33. The ring gear 32 is supported by a part of the casting 1 as shown at 34 which serves as a bearing therefore. Mounted below two of the pinions 31 are bushings 35 which surround the shafts 21 and serve as thrust bearings for the pinions. The shafts 21 are mounted in passageways 36 which extend from one side of casting 2 to the other side, there being bosses 37 and 38 on the inner part of the casting as shown in Figure 3. Instead of having a bushing 35 on the third shaft I mount a gear 39 whose shoulder 40 rests against the boss 37 directly below the pinion 31. This gear is attached to pinion 31 in three places as by means of bolts or pin 41 so that when gear 39 is rotated pinion 31 on the third shaft 21 and with it the shaft is also rotated and when it is rotated the other two pinions and their shafts are also rotated by means of the ring gear 32. The gear 39 is controlled by means of a worm 42 which is keyed to a shaft 43 as by a key pin 44. The shaft 43 is supported to rotate in a bearing block or pad 45 as clearly shown in Figure 4. At its outer end, which may extend beyond casting 2, the shaft 43 is reamed out to form a socket 46 for a key not shown. It will be readily seen that, by turning the key, worm 42 will rotate and since it meshes with gear 39, said gear will rotate and with it the pinion 31 keyed thereto and as before stated through ring gear 32, the other two pinions 31 will rotate. Since rotation of pinions 31 causes rotation of shafts 21 all of the sleeves 9 carrying the rollers 8 will move simultaneously to move the rollers 8 radially into and out of engagement with the flared ends 6 of the glass tube to center the tube on the chuck by engagement with the outer tube surface. The rollers being resiliently mounted by means of the springs 30 will yield in a direction axially of the tube and will ride upon the flange of the tube to resiliently clamp it in the axial direction against the gasket 7. The castings 1 and 2 may be locked together by means such as three screws 47 to form a housing for the gears and the bearing block 45 is keyed to the housing as by screw studs 48. The housing may be locked to a horizontal rotatable shaft by means of screws or the like passing through holes such as shown at 49.

The operation of my chuck assembly appears obvious from the above description but I will describe its operation briefly. After the housing has been attached to a rotatable shaft or spindle the flared end of a glass tube is held against the asbestos gasket. A key is then inserted in socket 46 and rotated causing the sleeves with their attached rollers 8 to be rotated equally inwardly by means of the common ring gear 32 engaging pinions 31 attached to each of the pinion shafts. The rollers are pressed against the face of the flanges 6 of the article by means of the spring mechanism 30 and since they are resiliently mounted will ride on the flanges to accommodate flanges of different form and thicknesses. By simple manipulation of the key all three rollers are simultaneously moved and adjusted and the centering of the glass article is effected by the engagement of the rollers with the peripheral outer surface of the tubular article portion.

In this adjustment of the rollers the rollers are supported to be movable in unison and to be non-yielding in the approximately radial direction of their centering adjustment thus to maintain a concentric relation at all times. The adjusting mechanism employing the worm and worm gear drive is further self-locking in the adjusting operation.

What is claimed is:

1. A flared article chuck assembly comprising three resiliently mounted rollers each roller being attached to a sleeve pivotally mounted on a supporting block which has a hollow pinion shaft depending therefrom and a pinion gear keyed to said pinion shaft, there being a ring gear common to all of the pinions, and means for simultaneously operating all of the rollers to swing them out of and into position with regard to the flange of a flared article, said means comprising a worm which cooperates with a gear attached to one of the pinions whereby when the worm is rotated it rotates the gear and pinion attached thereto and through the ring gear the other two rollers are swung at the same time and to the same degree to thereby center said flared article.

2. A flared article chuck assembly comprising a body member, spring mounted roller arm assemblies pivotally mounted on the body in circumferentially spaced relation, said roller arm assemblies consisting of bearing block elements provided with bearing sleeves for pivotal support and formed with pivot bearings for roller arms extending transversely to the bearing sleeve axis and with opposite guide slots in a plane coaxial with the bearing sleeve, roller supporting arm members supported by the transverse bearings and provided with cross pins fitted within the guide slots and having lateral bearing engagement with the blocks, an internal bearing shoulder on the bearing sleeve, headed plunger pins pivoted on the cross-pins and extended within the sleeves and compression springs interposed between the plunger pin heads and the sleeve shoulders to effect pressure movement of the roller supporting arms toward the body member.

3. A flared article chuck assembly comprising a body member, spring mounted roller arm assemblies pivotally mounted on the body in circumferentially spaced relation, said roller arm assemblies consisting of bearing block elements provided with bearing sleeves for pivotal support and formed with pivot bearings for roller arms extending transversely to the bearing sleeve axis and with opposite guide slots in a plane coaxial with the bearing sleeve, roller supporting arm members supported by the transverse bearings and provided with cross pins fitted within the guide slots and having lateral bearing engagement with the blocks, an internal bearing shoulder on the bearing sleeve, headed plunger pins pivoted on the cross-pins and extended within the sleeves and compression springs interposed between the plunger pin heads and the sleeve shoulders to effect pressure movement of the roller supporting arms toward the body member and means to rotate the bearing in unison.

4. A chuck assembly for holding a flared work piece while said work piece rotates about a central axis, comprising a plurality of lever arms disposed tangentially of said work piece, a work-engaging tool carried on one end of each lever arm, means for simultaneously swinging all of said lever arms radially of said central axis, said means including pivot shafts for each lever arm, pivotal means to permit said arm to swing in planes parallel to said central axis and yieldable pressure applying means for moving said arms in said planes toward said workpiece.

JOSEF BUDIG.

REFERENCES CITED

The following references are of record in the file of this patent:

UNITED STATES PATENTS

| Number | Name | Date |
| --- | --- | --- |
| 6,681 | Martin | Aug. 28, 1849 |
| 149,991 | Clever | Apr. 21, 1874 |
| 391,533 | Howard | Oct. 23, 1888 |
| 1,071,433 | Kenerson | Aug. 26, 1913 |
| 1,327,194 | Bright | Jan. 6, 1920 |
| 1,412,170 | Dixon | Apr. 11, 1922 |